United States Patent Office 3,198,766
Patented Aug. 3, 1965

3,198,766
PREPARATION OF SILICON POLYMERS EMPLOYING UNSATURATED HYDROCARBON MONOMERS
Siegfried Nitzsche and Robert Müller, Burghausen, Bavaria, Germany, assignors to Wacker-Chemie G.m.b.H., Munich, Bavaria, Germany
No Drawing. Filed June 28, 1961, Ser. No. 120,190
Claims priority, application Germany, July 8, 1960, W 28,154
6 Claims. (Cl. 260—46.5)

This application is a continuation-in-part of the pending United States application Serial No. 48,565, filed August 10, 1960, now abandoned.

This invention relates to a novel method for preparing new organic polymers.

The preparation of organic polymers employing unsaturated hydrocarbon monomers is a known and ever-growing art. It is known that unsaturated aliphatic hydrocarbons can be added to a variety of hydrogen silicon compounds and polymers with the aid of certain metals and metal compounds as catalysts. It is the object of this invention to carry out a simultaneous polymerization of an unsaturated aliphatic hydrocarbon monomer and addition of a hydrogensilicon material thereto. A simple polymerization method with improved yield is also sought. Another object is a new series of derivatives of polymers. New polymers prepared by new methods are also an object. Other specific and general objects and advantages are detailed in or will be apparent from the following disclosure.

This invention comprises preparation of valuable high molecular weight organic polymers by reacting (1) a polymerizable organic compound containing at least one aliphatic multiple bond with (2) an organosilicon compound containing at least one hydrogen atom bonded to a silicon atom in each molecule, in the presence of (3) a compound of a metal selected from the group consisting of Ti, V, Cr, Zr, Nb, Cb, Mo, Hf, Ta and W, and (4) a metal selected from Mn, Os, Ir, Pt, Rh, Pd, and Au. The reaction can be carried out in an organic solvent if desired. The metallic ingredient (4) can be added as a compound which is reduced to the metal under the conditions of reaction.

This invention also includes the further reaction of (A) the polymeric products prepared from acetylene compounds by the above method with (B) an oxygen-containing acid, whereupon ester-like decomposition products are obtained which can readily be converted to water soluble materials.

The polymerizable unsaturated organic compounds employed herein are hydrocarbon alkenes and alkynes such as ethylene, propylene, pentene, octene, octadecylene, cetene ($C_{16}$), cerotene ($C_{26}$), melene ($C_{30}$), acetylene, butyne-1, heptyne-1, dodecyne-1, methylethylethylene, isobutylene, 3-methylbutyne-1, pentene-2, 2-methylbutene-2, pentyne-2, butadiene-1,3, allene ($CH_2$=CH=$CH_2$) pentadiene, isoprene, methylisoprene, vinylacetylene, divinylacetylene, diacetylene, dipropargyl (HC≡C$CH_2$$CH_2$C≡CH)

hexadiyne-2,4,cyclopentene, cyclohexene, laurolene, cyclopentadiene, styrene, divinylbenzene, allylbenzene, phenylbutadiene, and phenylacetylene. Included in the operable organics are olefinic, acetylinic, di- and poly-olefinic, di- and poly-acetylinic, cycloolefins, and alkyl- and aryl-substituted or branched alkenes and alkynes. Non-hydrocarbon substituents can be present in the unsaturated organic compound. Thus halogen, oxygen (in the form of acids, anhydrides, alcohols, esters and ethers), nitrogen and metals such as Si, Ti, Zr, P, Ge, Sn and B can be present in the unsaturated molecule as in vinyl chloride, allyl bromide, allyl iodide, allylene bromide, tri- and tetrachoroethylene, tetrafluoroethylene, chloroprene, propargyl chloride, vinylidene chloride, dichlorostyrene, vinyl acetate, vinyl butyl ether, acrylic acid ester, acrylic acid nitrile, methacrylic acid ester, methacrylic acid nitrile, propiolic acid, allyl alcohol, methylvinyl-carbinol, acrylic acid, methacrylic acid, vinylacetic acid, oleic acid, sorbic acid, linolenic acid, chaulmoogric acid, butenyl acetate, allyl stearate, diallyl succinate, diallyl glutarate, methylene malonic ester, diallyl phthalate and diallyl maleonate. Particularly useful are hydrocarbon olefins and hydrocarbon alkynes and their alkyl and aryl derivatives as well as functional derivatives thereof including esters, ethers, halides, nitriles and unsaturated acids.

The organosilicon compounds employed herein must contain in each molecule at least one hydrogen atom bonded directly to silicon. Monomeric, polymeric and copolymeric silicon compounds and mixtures thereof can be employed. Operable materials include inorganic hydrogen silanes such as $HSiCl_3$ and $H_2SiBr_2$ and organohydrogensilanes such as $RSiHCl_2$ and $R_2SiHCl$ wherein each R is a monovalent hydrocarbon, halohydrocarbon, hydrocarbonoxy, halohydrocarbonoxy, carboxy, amino or imino radical. Also operable are polymers including polysilanes, polysiloxanes, polysilcarbanes, polysilazanes or any polymers and copolymers of such polymeric units with other like or unlike units or with purely organic units. Suitable polymers include $Cl_2HSiSiHCl_2$, $R_2HSiSiBr_3$, $R_2HSiOSiR_2H(RHSiO)_a$ where $a$ is at least 3, $R_3SiCH_2CH_2SiHCl_2$ $R_3SiC_6H_4SiH_2OR$, $R_3SiO(RHSiO)_bSiR_3$, where $b$ is a positive integer, and copolymers containing any one or more of units $R_3SiO_{1/2}$, $R_2SiO$, $RSiO_{3/2}$ and $SiO_{4/2}$ along with at least one unit per molecule of the formulae $RHSiO$, $R_2HSiO_{1/2}$, $HSiO_{3/2}$, $H_2SiO$, and $RH_2SiO_{1/2}$.

In all of the preceding formulae each R can be any organic radical and each R can represent the same or different radicals in any particular molecule. In the preferred embodiments, each R represents a monovalent hydrocarbon or halohydrocarbon radical including alkyl radicals such as methyl, ethyl, butyl and octadecyl; cycloalkyl radicals such as cyclohexyl and cyclopentyl; aryl radicals such as phenyl, diphenyl and anthracyl; aralkyl radicals such as benzyl and phenylethyl; alkaryl radicals such as tolyl and ethylphenyl; haloaryl such as monochlorophenyl, dichlorophenyl, 3,3,3-trifluoropropyl, α,α,α-chlorotolyl, perchloroethyl, bromocyclohexyl, bromobenzyl, and so forth.

The preferred Si-H containing compounds are those having the general formula $R_xSiH_zY_{4-x-z}$ and hydrolysis products thereof, wherein R is as above defined, each Y is a halogen atom, alkoxy radical or —OOCR radical where R is as above defined, $x$ is 0, 1 or 2, and $z$ is 1 or 2. The hydrolysis products are of the unit formula $$R_xH_zSiO_{\frac{4-x-z}{2}}$$

where R, $x$ and $z$ are as above defined but $x+z$ is less than 4. Commercial availability and cost factors favor the use of methylhydrogensiloxanes of unit formula $CH_3SiHO$.

The catalyst system includes (3) alkylates, acylates, enolates and halides of titanium, vanadium, chromium, zirconium, columbium, molybdenum, hafnium, tantalum, and tungsten. Preferred are the compounds of Ti, V and Zr because of availability and superior performance. Operative titanium and zirconium enolates are disclosed in U.S. Patent No. 2,833,735, issued May 6, 1958. Operative zirconium compounds are further disclosed in Patent No. 2,789,956, issued April 23, 1957, and Patent No. 2,728,736, issued December 27, 1955. Further examples of operative Ti compounds are disclosed in U.S. Patents No. 2,721,855, issued October 25, 1955, No. 2,732,318, issued January 24, 1956, and No. 2,736,721, issued February 28, 1956. Corresponding compounds of V, Cr, Cb, Mo, Hf, Ta, and W are also operative.

In place of the compounds of metals set forth as ingredient (3), the catalyst mass can contain a compound of a metal in groups VIIB, VIII, IB, IIB, IIIA of the periodic chart of elements, such metals being Mn, Tc, Re, Fe, Ru, Os, Co, Rh, Ir, Ni, Pd, Pt, Cu, Ag, Au, Zn, Cd, Hg, Al, Ga, In, and Te. The operable compound must be soluble in aliphatic or aromatic hydrocarbon solvents or ethers or they must be wetted by these solvents. The compounds wetted by solvents are those wherein the angle of wetting of a solution of the compound in an aliphatic or aromatic hydrocarbon or ether solvent equals 0.

The co-catalyst (3) is preferably unsaturated in the sense of Werner's theory of coordination (see H. Rompp, "Chemi Lexikon," 4th Edition, Stuttgart, 1958, p. 2398, Sec. 5). Examples of compounds operable as co-catalysts (3) include metal carbonyls such as $Fe(CO)_5$, metal salts of carboxylic acids such as $Mn(OOCCH_3)_3$, halides such as $ReCl_3$, alkoxy- and aryloxy compounds such as $TlOC_2H_5$, $Mn(OC_2H_5)_2$, $Re(OC_2H_3)_3$, $$Fe(OC_2H_5)_3$$

$Co(OC_2H_5)_2$ and $Ni(OC_2H_5)_2$ and chelates such as acetoacetic ester chelate of cobalt $Co(C_6H_9O_3)_2$, Co(II)-acetyl acetonate, Ni(II)-acetyl acetonate, Fe (II)-acetyl acetonate, and Mn(II)-acetyl acetonate.

Also included in the catalyst system is (4) a metal selected from transition elements including manganese, osmium, iridium, plaitnum, ruthenium, rhodium, palladium and gold. The metal is introduced in a finely divided or powdered form as in platinum black, platinized silica gel, platinized asbestos, platinized charcoal and similar forms of the manganese, osmium, iridium, ruthenium, rhodium, palladium and gold. Alternatively, the metal can be added as a compound which is reduced to the metal under the conditions of reaction such as $OsO_4$, $H_2OsCl_6$, $H_2IrCl_6$, $H_2PtCl_6$, $H_3RhCl_6$, $H_2PdCl_6$, $H_2MnCl_6$, $HAuCl_4$ and hydrates of such compounds. Only after the metal compound has been reduced does it exert the catalytic effect.

It is further suggested that the finely divided metals operable as ingredient (4) can include iron, cobalt and nickel.

The proportions of (2) hydrogensilicon compound and (1) unsaturated organic compound employed herein depends only upon the silicon content desired in the ultimate product. An excess of either reactant can be employed and products containing unreacted ≡SiH groups or unreacted olefinic or acetylenic linkages may be desired. However, it is preferred to use at least 2 mols of the catalyst (3) and $10^{-10}$ to $10^{-3}$ mols of the transition element as catalyst (4) for each equivalent of silicon bonded hydrogen to be reacted.

A wide variety of reaction conditions are operable herein. Reaction under vacuum, with heat, under pressure, in vapor phase or fluid bed and other variations are possible and are included within the scope of the invention. Because of the wide variety of reactants, the exact reaction conditions can be chosen to fit reactants, processing characteristics and desired product. A preferred embodiment comprises mixing (1) the unsaturated organic monomer or monomers, (2) organosiloxane containing silicon bonded hydrogen, and (3) the compound of Ti, V, Cr, Zr, Cl, Mo, Hf, Ta, or W in an inert solvent such as an aliphatic or aromatic hydrocarbon and/or ether which is fluid at the reaction temperature. The metal or metal compound of a transition element is added as catalyst (4) dissolved or dispersed in an organic ether, alcohol, or other suitable solvent. The reaction mass is heated in the range from room temperature up to 200° C. under normal or elevated pressure. The reaction occurs readily with excellent yields.

The polymeric products may contain unreacted ≡SiH groups which can be removed by washing or digesting the polymer in slightly alkaline alcohol. The polymeric products are high polymers and include viscous fluids, gels, rubber-like gums, and moldable powders. The product depends upon the organic monomers employed as well as on the ratio of HSi to monomer in the reaction mass and to the degree of polymerization carried forward. All of the products contain silicon generally found at the chain ends of the telomeric products.

Products containing functional groups such as CN, COOH, COOR, OH, and so forth, can be further reacted with difunctional alcohols. Products containing unreacted double bonds which may be residual bonds or may result from reaction of an acetylenic linkage with SiH to produce the expected $$\overset{H}{C}=\overset{}{C}Si$$

unit, can be converted to other useful products by addition reactions. For example, the double bond can be employed for further modification by reaction with oxygen-containing acids with final saponification. Further, the double bond containing polymers can be halogenated, etc.

The subsequent reactions of the polymers prepared as noted above with oxygen containing acids is a further part of this invention. The polymerization products of acetylene are of commercial interest but have not attained wide commercial use. The polymerization method disclosed above is applicable to acetylenic monomers to produce polymers which contain silicon in the chemical structure. Such polymers are further reacted with nitric acid to produce corresponding nitrates, with sulfuric acid to produce the corresponding sulfate, with acetic acid in the presence of zinc chloride to produce the acetate, and so forth. When oxidizing acids are employed, the Si-C bonds are cleaved thus esterifying the polymer and removing the pendent silicon groups simultaneously.

The oxygen-containing, esterlike polyene derivatives obtained as above can be converted to water soluble polyols via saponification, preferably in the presence of standard saponification catalysts such as dilute acids and alkalis, if desired under pressure. The water soluble alkali salts of the sulfated products display surface active properties and can be used as wetting agents. Such salts are obtained from the reaction products of polyene and sulfuric acid through further reaction with alkalis.

The unsaponified polyene esters are useful per se in adhesives, molding resins, preparation of artificial fibers, and a host of other uses. The nitrate derivatives find particular use as explosives.

The following examples are included herein to aid those skilled in the art in understanding and practicing this invention. The scope of the invention is defined in the appended claims and is not restricted by the examples. All parts and percentages in the examples are based on weight unless otherwise indicated.

*Example 1*

A mixture was prepared with 74 g. acrylic acid stabilized with methylene blue to prevent spontaneous polymerization, 60 g. methylhydrogensiloxane prepared by hydrolysis of methyldichlorosilane and stripping the hydrolyzate to 150° C. at atmospheric pressure (hereinafter MHS), 250 ml. tetrahydrofuran and $3 \times 10^{-5}$ mol chloroplatinic acid dissolved in ether. The mixture was heated to reflux and after 2 hours refluxing no reaction could be observed. 1.5 ml. tetra-n-butyltitanate was added and refluxing continued and immediately a reaction started. A viscous mass was obtained during 2 hours refluxing. The reaction mass was separated from solvent by distilling off the solvent and 15 g. of unreacted acrylic acid was recovered. The reaction product was washed with benzene and then with weakly alkaline ethanol. The product obtained was a polymeric material and was tacky, stringy, soluble in hot water and in caustic soda. The unaltered product could be precipitated from caustic soda solution by acidification. The product dissolved and precipitated three times from caustic soda solution contained 8.3% of silicon.

Example 2

A mixture was prepared with 148 g. acrylic acid, stabilized as in Example 1, and 30 g. MHS dissolved in 200 ml. tetrahydrofuran and 200 ml. toluene mixed with 4 ml. tetra-n-butyltitanate and $3 \times 10^{-5}$ mol chloroplatinic acid and heated at reflux for 2 hours. The reaction product was processed in accordance with the procedure of Example 1. All of the acrylic acid had polymerized to form an elastic gumlike mass with a silicon content of 3.2%.

Example 3

A mixture of 52 g. acrylonitrile and 60 g. methylhydrogensiloxane cyclic tetramer [$(CH_3HSiO)_4$] was dissolved in 150 ml. benzene. The catalyst mix of $3 \times 10^{-5}$ mol of chloroplatinic acid and 0.5 ml. tetra-n-butyltitanate was added to the mixture and the mass refluxed for 20 minutes. The reaction mass was processed as in Example 1 to produce a 60% yield of pulverulent acrylonitrile polymer having an Si content of 1.4% based on the acrylonitrile.

Example 4

A mixture of 52 g. acrylonitrile and 60 g. MHS was dissolved in 150 ml. toluene. The catalyst mix of 4 ml. tetra-n-butyltitanate and $1 \times 10^{-5}$ mol chloroplatinic acid was added and the reaction mixture was refluxed for 30 minutes. The reaction mass was processed in accordance with the method of Example 1 and a quantitative yield of pulverulent polyacrylonitrile containing 2.5% silicon was obtained.

Example 5

A mixture of 100 g. phenylacetylene, 25 g. $(CH_3HSiO)_3$ and 4 g. tetra-n-butyltitanate was dissolved in 200 ml. benzene. The mixture was heated to reflux after the addition of $2 \times 10^{-5}$ mols of chloroplatinic acid. Reaction and polymerization were initiated at 80° C. and proceeded exothermically. After concentrating the solution by solvent evaporation, the mass was precipitated with ethanol. A viscous dark polymeric mass containing SiH groups (0.1% active hydrogen) was obtained. The polymer mass was treated with .01 N methanolic potash lye producing cross linking and evolution of hydrogen. The cross-linked polymer was not soluble in organic solvents and contained 7.5 percent silicon.

Example 6

A mixture of 15 g. MHS and 5 g. tetra-n-butyltitanate dissolved in 100 ml. benzene was heated at reflux under nitrogen until the solution was a deep blue. The catalyst system was completed by adding $1 \times 10^{-5}$ mol of chloroplatinic acid. The mixture was held at 60° C. and 54 g. of styrene was slowly added in drop-wise fashion. The polymer so produced was precipitated from a concentrated solution by adding ethanol. The polymer was redissolved in toluene and reprecipitated a total of 15 times. The polymer so obtained contained 0.1% silicon and further dissolving and precipitation did not alter this polymer. The polymer had a melting point of 170° C.

Example 7

The method of Example 6 was repeated employing 30 g. MHS, 5 g. tetra-n-butyltitanate, $1 \times 10^{-5}$ mol chloroplatinic acid and 54 g. styrene. A viscous oil with a silicon content of 9.4% was obtained. The oil contained $\equiv$SiH groups and formed a gel when contacted with .01 N alcoholic potash lye which cleaved hydrogen off the silicon and produced cross-linking in the polymer.

Example 8

A mixture of 15 g. MHS and 2 g. $VO(OC_2H_5)_3$ in 200 ml. benzene was refluxed until it became light blue in color. A mixture of 54 g. styrene and 43 g. acrylic acid methyl ester was added at 60° C. Finally $3 \times 10^{-5}$ mol of $H(AuCl_4) \cdot 4H_2O$ was added to the mass and a stormy reaction occurred. The polymeric product was precipitated with alcohol and there was obtained an 80% yield of a pulverulent polymeric product containing 0.5% silicon calculated on the weight of monomers.

Example 9

A mixture of 15 g. MHS and 5 g. tetra-n-butyltitanate was dissolved in 200 ml. xylene and the solution changed to a 3 neck flask equipped with gas inlet tube and fused frit, stirrer and reflux condenser with gas outlet tube. The solution was heated to 140° C. with nitrogen bubbling through it and the solution turned dark blue. After addition of $1 \times 10^{-5}$ mol of chloroplatinic acid, an acetylene stream was bubbled into the solution at 4 bubbles per second for 2 hours. The product obtained was a black powder which was filtered from the reaction mass and cleaned by washing with xylene. The polymeric powder obtained contained 9.6% silicon.

Example 10

A mixture of 10 g. MHS and 3 g. tetra-n-butyltitanate was dissolved in 250 ml. ligroin (B.P. 150°–180° C.). The solution was placed in a 1 liter steel autoclave and heated to 120° C. under nitrogen until the solution was deep blue. A solution of 7 mg. chloroplatinic acid in 0.5 ml. ether was added via pipette. The nitrogen was driven out of the autoclave by introducing purified acetylene. Further acetylene was added to a pressure of 10 atmospheres at 115° C. and further acetylene was added to maintain that pressure at 115° C. during the reaction. An immediate reaction was noted. After 6 hours the autoclave was cooled and vented and the reaction mass filtered. The polymeric product was washed with alcohol and acetone and dried. A fine black powder was obtained in good yield. The polymeric powder was excellent as a filler for rubber.

Example 11

Equivalent results were achieved when Example 1 was repeated substituting chemically equivalent amounts of the following materials for the acrylic acid: ethylene, pentene, pentene-2, butyne-1, methylethylethylene, allene, methylisoprene, dipropargyl, cyclopentene, vinylchloride tetrafluoroethylene, vinylacetate, vinylacetic acid, methylvinylcarbinol and diallylphthalte.

Example 12

Equivalent results were achieved when Example 2 was repeated substituting equivalent amounts of the following materials for the methylhydrogensiloxane: methylhydrogendichlorosilane, dihydrogenotetramethyldisiloxane, trimethylsilyl endblocked methylhydrogensiloxane polymers of 50–1000 cs. at 25° C., copolymers of 10 mol percent methyl hydrogensiloxane and 90 mol percent of units chosen from methylsiloxane units ($CH_3SiO_{3/2}$), dimethylsiloxane units and trimethylsiloxane units.

Example 13

Equivalent results were achieved when Example 3 was repeated substituting the following metal compounds for the tetra-n-butyltitanate: tetrapropyltitanate, tertiarybutyltrimethylzirconate, octyleneglycolylzirconate, tetra-2-ethylhexylzirconate, titanium chloride, titanium acetate, and the corresponding compounds of vanadium, chromium, columbium, molybdenum, hafnium, tantalum and tungsten.

Example 14

Equivalent results were achieved when Example 4 was repeated substituting the following metals and metal compounds for the chloroplatinic acid: powdered manganese, osmium, iridium, platinum, rhodium, palladium and gold and $H_2OsCl_6$, $H_2IrCl_6$, $H_3RhCl_6$, $H_2PdCl_6$, $H_2MnCl_6$ and hydrates of such compounds.

Example 15

The black polymeric powder prepared in Example 9 was heated to 90° C. with concentrated sulfuric and in the presence of catalytic traces of mercuric oxide. The polymeric powder dissolved to produce a deep red solution and silica was separated. The solution was filtered and the filtrate was neutralized with soda lye. The sodium salt of the sulfonated polymer was precipitated with sodium chloride. The sodium salt so prepared is soluble in water and displays excellent surface activity.

Example 16

The black pulverulent polyene prepared in Example 9 was treated with a mixture of acetic acid and acetic acid anhydride in the presence of dry zinc chloride and at 100° C. A pale yellow product containing residual silicon was formed. The acetylated polymer was saponified with dilute mineral acids to produce water soluble products identified as silicon containing polyols.

Example 17

The black pulverulent polyene of Example 9 was heated with 10% aqueous persulfuric acid solution. A water soluble, white, silicon containing polymer was obtained by saponifying with dilute mineral acids.

Example 18

The black powdered polyene of Example 9 was heated silghtly with concentrated nitric acid. Silica was recovered and a yellow powder was obtained. The yellow powder was soluble in acetone and decomposed explosively under thermal or mechanical agitation.

Example 19

The black powdered polyene of Example 9 was treated at low temperature with chlorine water. A pure white mass was formed which contained silicon and chlorine and was soluble in chloroform.

Example 20

A mixture of 10 g. of MHS and 1.7 g. cobalt-(II)-acetyl acetonate was heated in a 3-necked flask which was equipped with gas inlet tube, stirrer and reflux cooler together with 150 ml. ligroin (B.P. 150°) and 100 ml. dibutylether under nitrogen until the mixture was a yellowish brown. After adding $1 \times 10^{-5}$ mols of $H_2PdCl_6$ in 0.5 ml. diethylether, acetylene which had been purified over active carbon was introduced for 3 hours. A black powder resulted which was filtered off and cleaned by washing with ethanol.

Example 21

A mixture of 2 g. cobalt tetracarbonyl, 17 g. MHS and 1700 ml. ligroin (B.P. 150–180°) was heated in a steel autoclave under a nitrogen atmosphere to 120° until the evolution of $CO_2$ gas had come to an end and the solution was dark brown. 2.2 mg. paladium hydrochloric acid dissolved in 0.2 ml. ether were added, and ethylene was forced in at 25 at. for 3 hours at 125° while stirring. The solution was mixed with methanol and the precipitated product was cleaned with 10% HCl. 44 g. of a wax-like mass with an Si content of 0.8% was obtained.

Example 22

A mixture of 1.5 g. iron pentacarbonyl and 20 g. MHS was dissolved in 1000 ml. toluene and the solution was heated under nitrogen to 60° until the evolution of CO gas had come to an end and the solution was dark brown. After adding 3 mg. of platinum HCl, a mixture of 51 g. phenyl acetylene and 52 g. styrene was slowly added to the solution while stirring. After the reaction had ended the solution was mixed with ethanol and an orange viscous product was obtained, which after further precipitation from toluene with ethanol, contained 0.3% Si and had an iodine count of 54.

Example 23

A mixture of 2 g. of manganese triacetate in 150 ml. dibutylether was added to a solution of 15 g. MHS in 1300 ml. dekalin in a 2.8 liter steel autoclave while stirring. After adding 2.2 mg. of paladium HCl it was heated to 135° under nitrogen and the acetylene was forced in at 15 at. After the reaction the product was drawn off the solvent, treated with 10% HCl and the absorbed dekalin was removed by vapor distillation. 270 g. of a black powder were obtained with an ash content of 7.6%.

That which is claimed is:

1. A polymerization method comprising mixing and reacting (1) an organic compound containing aliphatic unsaturation selected from the group consisting of hydrocarbon alkenes and alkynes, halogenohydrocarbon alkenes and alkynes, alkenes and alkynes containing carbon, hydrogen and oxygen atoms wherein the oxygen is present in a form selected from the group consisting of ether linkages, —COOH groups, anhydride groups, —OH groups and ester groups, and alkenes and alkynes containing carbon, hydrogen and nitrogen atoms, and (2) a hydrogen-silicon compound containing at least one hydrogen atom bonded directly to silicon in each molecule selected from the group consisting of inorganic hydrogen silanes, organic hydrogen silanes, organic hydrogen polyslianes, organic hydrogen polysiloxanes, organic hydrogen polysilcarbanes, organic hydrogen polysilazanes and mixtures of the foregoing where the organic substituents are selected from the group consisting of alkyl radicals, cycloalkyl radicals, aryl radicals, aralkyl radicals, alkaryl radicals, haloaryl radicals, and haloalkyl radicals, in the presence of (3) a compound selected from the group consisting of (A) a metal compound selected from the group consisting of alkylates, acylates, enolates and halides of Ti, V, Cr, Zr, Nb, Mo, Hf, Ta and W and (B) those compounds which are alternatively soluble in aromatic hydrocarbon, aliphatic hydrocarbon and ether solvents and wetted by these solvents and are unsaturated in the sense of Werner's theory of coordination, selected from the group consisting of metal carbonyls, metal salts of carboxylic acids, metal halides, metal alkylates, metal arylates and metal chelates of Mn, Tc, Re, Fe, Ru, Os, Co, Rh, Ir, Ni, Pd, Pt, Cu, Ag, Au, Zr, Cd, Hg, Al, Ga, In and Te, and (4) a metal selected from the group consisting of Mn, Os, Ir, Pt, Rh, Pd and Au.

2. The method of claim 1 wherein the metal (4) is added as a metallic compound which is reduced to the metal under the conditions of reaction.

3. The method of claim 1 wherein the organic compound (1) is an olefinic hydrocarbon compound.

4. The method of claim 3 wherein the organo-silicon compound (2) is an alkylhydrogensiloxane.

5. The method of claim 4 wherein the metal compound (3) is an alkylate of titanium.

6. The method of claim 5 wherein the metal (4) is platinum.

(References on following page)

References Cited by the Examiner

UNITED STATES PATENTS

| | | | |
|---|---|---|---|
| 2,632,013 | 3/53 | Wagner et al. | 260—448.8 |
| 2,910,461 | 10/59 | Nowlin et al. | 260—94.9 |
| 2,945,845 | 7/60 | Schmerling | 260—93.7 |

FOREIGN PATENTS 574,128   6/59   Belgium.

OTHER REFERENCES

Speier et al., J.A.C.S., 79, 974 (1957).
Ryan et al., J.A.C.S., 82, 3601 (1960).

MURRAY TILLMAN, *Primary Examiner.*
MILTON STERMAN, WILLIAM H. SHORT,
*Examiners.*

UNITED STATES PATENT OFFICE
CERTIFICATE OF CORRECTION

Patent No. 3,198,766 August 3, 1965

Siegfried Nitzsche et al.

It is hereby certified that error appears in the above numbered patent requiring correction and that the said Letters Patent should read as corrected below.

Column 1, line 40, strike out "Cb,".

Signed and sealed this 25th day of October 1966.

(SEAL)
Attest:

ERNEST W. SWIDER
Attesting Officer

EDWARD J. BRENNER
Commissioner of Patents